United States Patent [19]

Beauseigneur et al.

[11] Patent Number: 5,346,722
[45] Date of Patent: Sep. 13, 1994

[54] METHOD FOR IMPROVING THE THERMAL SHOCK RESISTANCE OF A WASHCOATED BODY

[75] Inventors: Patricia A. Beauseigneur, Waverly; Irwin M. Lachman; Mallanagouda D. Patil, both of Corning, all of N.Y.

[73] Assignee: Corning Incorporated, Corning, N.Y.

[21] Appl. No.: 63,495

[22] Filed: May 18, 1993

[51] Int. Cl.⁵ .............................................. B05D 1/32
[52] U.S. Cl. ................... 427/300; 427/299; 427/307; 427/333; 427/443.2; 428/116; 502/302; 502/303; 502/304; 423/273
[58] Field of Search ............... 427/299, 443.2, 333, 427/300, 307; 428/116; 502/302-304; 423/273.5

[56] References Cited

U.S. PATENT DOCUMENTS

| | | | |
|---|---|---|---|
| 3,885,977 | 5/1975 | Lachman et al. | |
| 4,127,691 | 11/1978 | Frost. | |
| 4,451,517 | 5/1984 | Inoguchi et al. | 428/116 |
| 4,483,940 | 11/1984 | Ono et al. | 502/159 |
| 4,532,228 | 7/1985 | Golino et al. | 502/261 |
| 4,619,909 | 10/1986 | Ono et al. | 502/303 |
| 4,831,009 | 5/1989 | Retallick | 502/334 |
| 5,039,650 | 8/1991 | Yamada et al. | 502/304 |
| 5,139,993 | 8/1992 | Schmidt et al. | 502/325 |

FOREIGN PATENT DOCUMENTS

0320033 6/1989 European Pat. Off. .

OTHER PUBLICATIONS

CRC Handbook of Chemistry and Physics, Buffer Solutions, p. D-186. 1978-1979.

*Primary Examiner*—Shrive Beck
*Assistant Examiner*—Brian K. Talbot
*Attorney, Agent, or Firm*—L. Rita Quatrini

[57] ABSTRACT

A method for producing a thermally shock resistant washcoated substrate involves introducing a buffer solution into the microcracks, and optionally the micropores of a porous sintered body, the pH of the buffer solution being at a predetermined value to result in the formation of a gel on contact of the buffer solution with the slurry which is to be subsequently applied, contacting the body with a washcoating slurry to form a gel at the interface of the buffer solution and slurry. Formation of the gel prevents the slurry from entering the microcracks. The body is then calcined at a temperature and for a time sufficient to form the washcoated substrate.

17 Claims, 3 Drawing Sheets

METHOD FOR IMPROVING THE THERMAL SHOCK RESISTANCE OF A WASHCOATED BODY

This invention relates to a method for improving the thermal shock resistance of bodies in their application as washcoated substrates for catalysts. The method involves selectively treating microcracks in the substrate to prevent the penetration of a high surface area oxide containing catalyst washcoat slurry during its application to the substrate.

BACKGROUND OF THE INVENTION

Ceramic honeycombs are widely used as catalytic substrates in automotive, woodstove, and other catalytic applications. The low thermal expansion of these honeycombs makes them excellent thermally shock resistant substrates for high temperature applications.

Generally, thermal shock resistance of a coated substrate is lower than that of a bare ceramic substrate. The thermal expansion coefficient (CTE) of cordierite honeycombs is known to be raised by alumina washcoats, resulting in a significant reduction in thermal shock resistance. It is widely assumed that one of the causes for the increase in CTE is due to penetration of washcoat particles and/or dissolved species into microcracks in the substrate, or precipitation of dissolved material on drying, the size of the penetrating material being generally smaller than the size of the microcracks. Thus, it is essential to block the microcracks during washcoating in order to preserve a high degree of thermal shock resistance.

At present, there are several methods to preserve the thermal shock resistance of washcoated ceramic honeycombs by selectively blocking either the microcracks, surface macropores, or both, prior to application of the washcoat slurry. Several U.S. patents describe the use of various kinds of precoats to reduce the effect of washcoats on CTE, and to improve thermal shock resistance. These patents are briefly described below.

U.S. Pat. No. 4,451,517 relates to catalyst support provided with activated alumina layer formed on the surface of the honeycomb without filling the microcracks with the alumina. This is done by first filling the microcracks with organic material which is subsequently burned away at temperatures lower than the sintering temperature of the activated alumina.

U.S. Pat. No. 4,483,940 relates to a method of manufacture of a honeycomb carrier of enhanced resistance to thermal shocks, which method comprises applying a coat of a water-soluble high-molecular organic compound to the surface of a ceramic honeycomb carrier of monolithic construction and subsequently depositing a catalyst component on the resultant coated carrier. After the washcoat and catalyst are applied, the substrate is fired, during which time the organic coating is burned out. The resulting gap between the substrate and washcoat reduces the "strains" due to the difference in CTE between the washcoat and substrate, resulting in improved thermal shock resistance.

U.S. Pat. No. 4,532,228 relates to depositing an organic material in the microcracks and, preferably, carbonizing the organic material prior to application of the washcoat, which organic material is burned out after application of the washcoat.

There remains a need for methods to improve or preserve the thermal shock resistance of washcoated ceramic bodies, especially honeycombs.

SUMMARY OF THE INVENTION

In accordance with one aspect of the invention, there is provided a method for producing a thermally shock resistant washcoated substrate which involves providing a porous sintered body having microcracks, introducing a buffer solution into the microcracks, and optionally into the micropores, but not into the macropores, the pH of the buffer solution being at a predetermined value to result in the formation of a gel on contact of the buffer solution with the slurry which is to be subsequently applied, and contacting the body with a washcoating slurry having a high surface area oxide or high surface area oxide precursor, and an agent capable of forming a gel at the interface of the buffer solution and slurry. Formation of the gel prevents the slurry from entering the microcracks. The body is then calcined at a temperature and for a time sufficient to form the washcoated substrate.

DETAILED DESCRIPTION OF THE INVENTION

Figure 1:
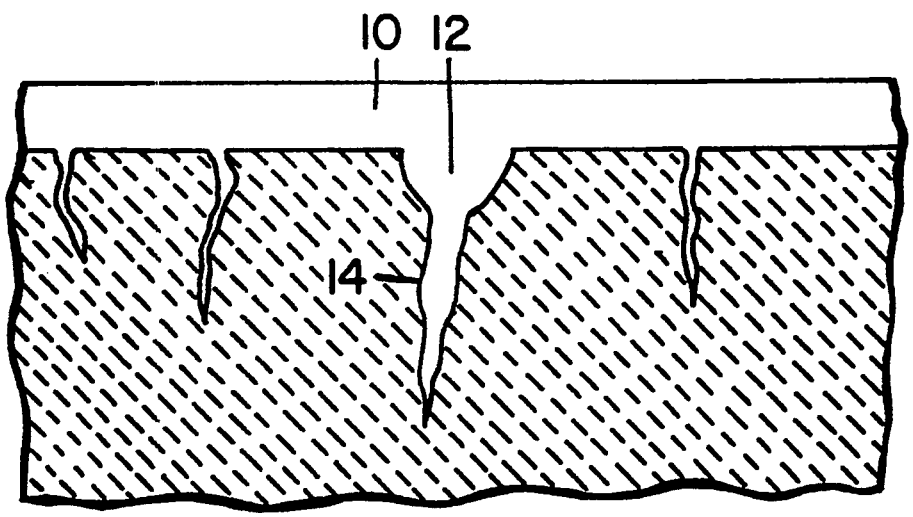
FIG. 1 is a schematic diagram of the surface of a body to be washcoated by the method of the present invention, showing the micropores and microcracks.

This invention relates to a method of improving the thermal shock resistance of bodies in their use as washcoated substrates. By washcoated substrates is meant the bodies having the washcoat deposited thereon. The method involves preserving microcracks during the formation of washcoated substrates by selectively blocking microcracks during the washcoating procedure. This is done by introducing a buffer solution into the microcracks and optionally into the micropores. In other words, the buffer solution is introduced into only the microcracks and possibly the micropores, but not into the macropores.

By buffer solution is meant the buffer compounds and the liquid in which they are dissolved. Typically, the body is contacted with a buffer solution to allow the solution to penetrate into the microcracks. When the body is relieved of excess solution and is partially dried, the solution remains in only the microcracks and possibly the micropores, and not in the macropores. When a washcoating slurry containing a gel forming agent is contacted with the body so treated, formation of gel occurs at the interface of the buffer solution and the slurry, that is for the most part, at the outer openings of the microcracks, and in the micropores, while the insides of the microcracks remain free of the gel. The formation of a gel from a slurry virtually stops the slurry movement because of the order of magnitude of the increase in viscosity. Upon drying and calcining to form the washcoat, at least the liquid portion of the solution that is trapped in the microcracks is removed by volatilization, thereby preserving the microcrack.

Preservation of microcracks according to the method of the present invention results in better thermal shock resistance in the washcoated substrate than if the washcoat is applied without first selectively blocking the microcracks.

The body or substrate is a porous sintered body, having microcracks and pores. The body is most desirably made of materials that are suitable for high temperature applications. Such materials are those that include as a predominant phase: ceramic, glass-ceramic, glass, and combinations of these. By combinations is meant physical or chemical combinations, e.g., mixtures or composites. By high temperature materials is meant those that are stable at temperatures of about 1000° C. or higher. Examples of these materials are cordierite, mullite, clay, talc, zircon, zirconia, spinel, aluminas and their precursors, silicas and their precursors, silicates, aluminates, lithium aluminosilicates, alumina silica, feldspar, titania, fused silica, nitrides, carbides, borides, e.g., silicon carbide, silicon nitride or mixtures of these.

Especially suited are ceramic materials, such as those that yield cordierite, mullite, or mixtures of these on firing. Some substrate materials that are especially suited to the practice of the present invention, although it is to be understood that the invention is not limited to these, are those made of cordierite, mullite, clay, talc, zircon, zirconia, spinel, alumina, silica, lithium aluminosilicates, alumina quartz, feldspar, titania, fused silica, nitrides, carbides, e.g., silicon carbide, silicon nitride or mixtures of these. Some typical ceramic substrates are disclosed in U.S. Pat. Nos. 4,127,691 and 3,885,977. Those patents are herein incorporated by reference as filed.

In accordance with a preferred embodiment, compositions which ultimately form cordierite upon firing are as follows in percent by weight, although it is to be understood that the invention is not limited to such: about 33 to about 41, and most preferably about 34 to about 40 of aluminum oxide, about 46 to about 53 and most preferably about 48 to about 52 of silica, and about 11 to about 17 and most preferably about 12 to about 16 magnesium oxide.

The bodies can be of any size and shape suitable to the application. The bodies are shaped to form green bodies, which are thereafter sintered. Preferred substrates are honeycomb structures. Most typically, the honeycombs are formed by extrusion of plasticized batches of the material or raw material precursors into green bodies which are thereafter sintered.

Some examples of honeycombs, although it is to be understood that the invention is not limited to such, are those having about 94 cells/cm² (about 600 cells/in²), about 62 cells/cm² (about 400 cells/in²), or about 47 cells/cm² (about 300 cells/in²), about 31 cells/cm² (about 200 cells/in²), about 15 cells/cm² (about 100 cells/in²), or about 1 cell/cm², (about 9 cells/in²). Typical wall thicknesses in catalytic converter applications, for example, are about 6 mils (about 0.15 mm) for 400 cells/in² (62 cells/cm²) honeycombs. Wall or web thicknesses range typically from about 4 to about 25 mils (about 0.1 to about 0.6 mm). The external size and shape of the body is controlled by the application, e.g. engine size and space available for mounting, etc.

The substrate or body can have any degree of porosity from low to high. By porosity is meant the open porosity: small pores or micropores, and large pores or macropores. The micropores have an average size of <5 micrometers in diameter. The macropores have an average size of ≧5 and typically about 5 to about 50 micrometers in diameter. Typically the open porosity ranges from about 1% by volume to higher values which are determined by practical limits depending on the composition of the substrate and the intended application. For ceramic monoliths, the open porosity is typically about 15% to about 60%, and preferably about 30-50% by volume.

The bodies have microcracks. According to the present invention, microcracks are defined as fine cracks of equal to or less than about 0.5 micrometers in width. The presence of microcracks for example, in cordierite bodies, allows the body to have a very low coefficient of thermal expansion (CTE) since they tend to be oriented perpendicular to the crystallographic direction of high thermal expansion of the cordierite crystals.

FIG. 1 is a schematic diagram of the surface (10) of a body showing the micropores (12) and microcracks (14).

The buffer solution is a solution which has a predetermined pH so that when it is subsequently contacted with the washcoat slurry containing the gel forming agent, the gel forms at the interface of the solution and the slurry. This immobilizes the slurry and prevents penetration of the slurry into the microcracks. The term gel is known in the art to mean a colloid which exists essentially in solid or semi-solid form. Some especially suited buffer solutions are aqueous solutions of ammonium chloride, ammonium nitrate, ammonium acetate, ammonium hydroxide, potassium phosphate, sodium hydroxide, boric acid, potassium chloride, sodium chloride, potassium carbonate, potassium borate, potassium hydroxide, and combinations of these. Typically the buffer solution is made up of one or more compounds which are substantially volatilizable at temperatures of up to about 600° C. By substantially volatilizable is meant that at the above temperatures, the solution, that is, the liquid and buffer compound will volatilize and decompose. The ammonium salts will completely volatilize at the above temperatures. The sodium and potassium salts, although they will not volatilize, will be present in such small quantities after decomposition because these buffers are very dilute, that their presence in the microcracks will not adversely affect the CTE as washcoat alumina would if allowed to enter the microcracks.

Common buffer solutions are known in the art. Some examples of buffer solution compositions are given in the CRC Handbook of Chemistry and Physics, 59th edition, 1978-79, CRC Press, page D-186 which page is herein incorporated by reference, from which the following compositions are derived:

| | Components | Volume ratio | pH at about 25° C. |
|---|---|---|---|
| 1 | 0.1 molar potassium dihydrogen phosphate/ 0.1 molar NaOH | 8.9 | 6 |
| 2 | 0.1 molar potassium dihydrogen phosphate/ 0.1 molar NaOH | 1.7 | 7 |
| 3 | 0.025 molar borax/ 0.1 molar HCl | 10.9 | 9 |
| 4 | 0.025 molar borax/ 0.1 molar NaOH | 2.7 | 10 |

The pH of the solution is selected to a predetermined value to result in the formation of gel in the subsequent step of contacting with the slurry. The pH of the solution depends on the pH of the slurry. The pH of the solution and the slurry must be the proper values to ensure formation of the gel. For example, for the above described buffer solution compounds, the pH is normally at least about 5, more typically at least about 6, and most typically about 7 to about 10, although buffer solution pH's can vary from these values.

The solution, scaled up to the proper amount depending on the dimensions of the body, is then introduced into the microcracks and optionally, all or some of the micropores without substantially entering the macropores. This can be done by any technique. However, a preferred technique will be described below.

In accordance with a preferred embodiment, the body is first contacted with the buffer solution e.g., by being immersed in the solution for a sufficient time to allow the buffer solution to penetrate to the microcracks. The body is effectively drenched with the buffer solution.

At this point, the body is removed from the solution and the excess solution is removed. The removal is done by draining, blowing, centrifuging, under temperature and time conditions to allow removal of at least the buffer liquid from all parts of the body except the microcracks and possibly some of the micropores. Some residual buffer compounds which were initially dissolved in the liquid can remain on the other surfaces of the body and will not adversely affect the subsequent gelling or washcoating. The drying can be done in a conventional or microwave oven. Microwaving conditions can be readily determined by those skilled in the art and examples of some microwave drying conditions for honeycombs are given in the examples that follow. From a practical standpoint, by knowing the amount of buffer solution (wt %) on the body, which can be determined by weight difference before and after contact with the solution, and by knowing the porosity measurement beforehand, one can predict how much solution will fill the microcracks and small pores by surface tension. Typically, the buffer solution causes an increase in weight of about 1% to about 15%, advantageously about 5% to about 12% and more advantageously about 8% to about 10%. One can then determine the amount of drying that is necessary in order to allow solution or at least the liquid, to remain in the microcracks and possibly the micropores, while removing at least the liquid from other parts of the body. Typically for honeycombs, the drying temperature in a conventional oven is about 90° C. to about 110° C. The time is controlled so that the dissolving liquid at least is removed from every part of the body except the microcracks and possibly part of the micropores.

Figure 2:
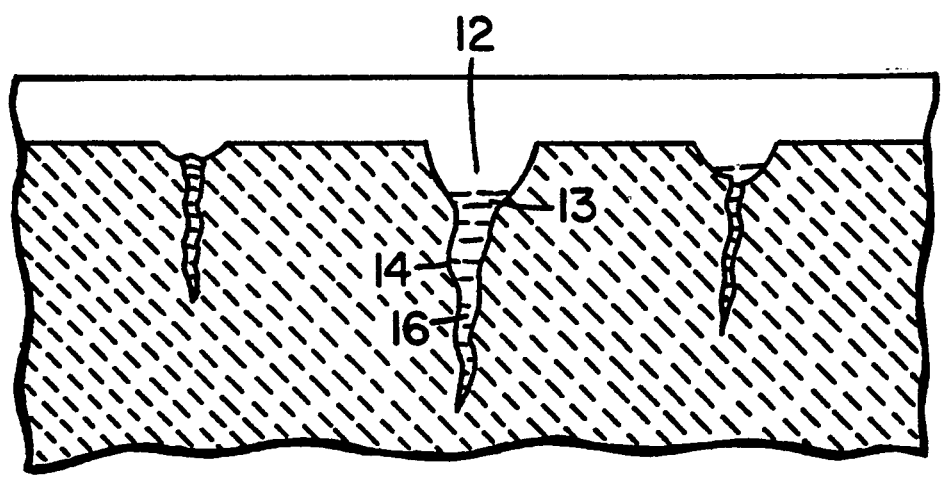
FIG. 2 is a schematic diagram showing microcrack and part of the micropore filled with the buffer solution.

FIG. 2 is a schematic diagram showing microcrack (14) and part (13) of the micropore (12) filled with the buffer solution (16).

The washcoating slurry contains one or more compounds that yield a high surface area oxide washcoat on heat-treating or calcining, such compounds being high surface area oxides and/or high surface area oxide precursors. By high surface area oxide precursor or oxide-yielding species according to the present invention is meant species that can yield the high surface area oxide washcoat on heat-treating. The surface area of the washcoat is typically no less than about 50 m²/g, more advantageously no less than about 150 m²/g and most advantageously about 180 to about 250 m²/g. The surface area is measured by the $N_2$ BET method which is known in the art. The surface area is measured as specific surface area, that is, the surface area divided by the mass of a powder sample having essentially the same composition as the washcoat. The high surface area of the washcoat helps maintain the dispersion of any catalyst that is to be supported thereon.

Most advantageously, the high surface area oxide and/or precursor and the gel forming agent are one and the same. Some such compounds that are suited to the practice of the present invention are oxides and oxide precursors of aluminum, cerium, barium, lanthanum, silicon, titanium, zirconium, and additionally, phosphates, and combinations of these. Especially suited are alumina, alumina precursors, ceria, baria, lanthana, lanthanates, silica, silicates, titania, titanates, zirconia, zirconates, and additionally, phosphates, and combinations of these.

Most advantageously, the high surface area oxide is alumina and its precursors. Some typical aluminum oxides are alpha alumina, gamma alumina, delta alumina, kappa alumina, eta alumina, theta alumina, rho alumina, and chi alumina. Most preferred is gamma alumina. Advantageously, the aluminum oxide precursors can be any one or combinations of aluminum nitrate, aluminum hydroxides such as bayerite ($Al(OH)_3$), aluminum hydroxylated oxides, such as boehmite (AlOOH), aluminum alkoxides, such as aluminum isopropoxide ($Al(C_3H_7O)_3$), peroxides, salts, e.g., aluminates, mixed metal compounds with transition metals, and combinations thereof which yield an alumina washcoat alumina on heat-treating. Some especially preferred aluminum oxide precursors are aluminum hydroxides, aluminum hydroxylated oxides, aluminum alkoxides, or combinations of these.

The slurry can have other components to aid in the washcoating or to enhance subsequent catalytic activity. Such components can be one or more rheological modifiers and/or binders. The rheological modifiers are agents which when present in the slurry modify the rheological properties of the slurry so that it can be applied uniformly to the substrate and for good structural integrity and to prevent unsatisfactory coating characteristics, e.g., cracking, chipping, and flaking. Rheological modifiers can be surfactants, dispersants, wetting agents, which are soluble or insoluble in the slurry medium, and acids or bases.

Some examples of rheological modifiers used typically in an alumina slurry are stearic acid, stearates, oxalic acid, commercial surfactants, etc. In such slurries, some of the aluminum oxides such as boehmite, and aluminum hydroxylated oxides, for example, and rare earth oxides can function as binders. Rare earth oxides are those of elements of atomic number 57-62, particularly cerium and lanthanum. Cerium oxide is most preferred.

The binder or binders are present in the slurry to promote interparticle adhesion between slurry components as well as adhesion to the substrate. The binder or binders must be compatible with the other slurry components and the slurry medium.

Some examples of binders in an alumina slurry are colloidal sols, e.g., alumina sols, or colloidal alumina having an average particle size, for example, of about 2 to 50 nanometers in diameter. Other aluminum oxides yielding species can function also as binders, e.g., boehmite. Preferred binders in this type of slurry are colloidal alumina, boehmite, and combinations thereof. Typically the pH is adjusted by addition of an acid such as, for example, nitric acid. The preferred pH is about 3 to about 4 to ensure that the viscosity is low with maximum solids content, for optimum coatability of the substrate with the alumina.

The slurry components are added in amounts sufficient to result in the desired levels of the respective components in the washcoat. Those skilled in the art would know what amounts of slurry components to use. In an alumina slurry, the typical solids content is about 20% to about 75% by weight, and more typical about 25% to about 75%, and most typical about 50% to about 60%.

Although it is conceivable that other mediums such as alcohols and mixtures thereof with water, can be used as long as the proper pH can be maintained for gel formation, in an alumina slurry the medium is typically water.

Some examples of preferred slurry solid compositions, although it is to be understood that the invention is not limited to these, are as follows in wt. % with water as the medium:

(1) about 30% $CeO_2$, about 10% $ZrO_2$ or BaO, or combinations, about 3% $La_2O_3$ or BaO, or combinations, about 57% $\gamma Al_2O_3$, or $SiO_2$, or $La_2O_3$, or $ZrO_2$, or combinations;

(2) 20–30 $CeO_2$, 2–10% $La_2O_3$, 2–10% $ZrO_2$, balance gamma alumina.

These slurries are typically about 50 wt. % solids and 50% water. Normally, the pH is adjusted with nitric acid or acetic acid.

In accordance with a preferred embodiment, with an alumina slurry, buffer pH values are at least about 5, more preferably at least about 6, and most preferably in the range of about 6 to about 8. The pH range of about 10 to about 14 is also advantageous for formation of alumina gel. With an alumina slurry, the pH is normally about 3 to about 4 for optimum coatability properties. In such cases, a buffer solution pH of about 6 to about 8 is especially advantageous for formation of alumina gel. However, and if considered necessary and feasible, the formation of alumina gel can be achieved by reversing the pH conditions. For example, the slurry can have a pH of about 8.5 to about 9.5 and the buffer solution can have a pH of less than about 7. Such conditions produce gel at the interface of the buffer solution and the slurry, although the viscosity of the pH 8.5–9.5 slurry is higher than the pH 3 to 4 slurry having a similar solids content.

The body which was prewetted with the buffer solution and then partially dried, is then contacted with the slurry to form a green coating comprising the oxide or precursor thereon and to form the gel at the interfaces of the buffer solution as previously described. This can be done by any convenient technique such as dipping, spraying, or washing, depending on size and geometry of the substrate, and the invention is not limited to any technique. By green coating according to the present invention is meant the coating before it is subjected to calcining or heat treating.

Figure 3:
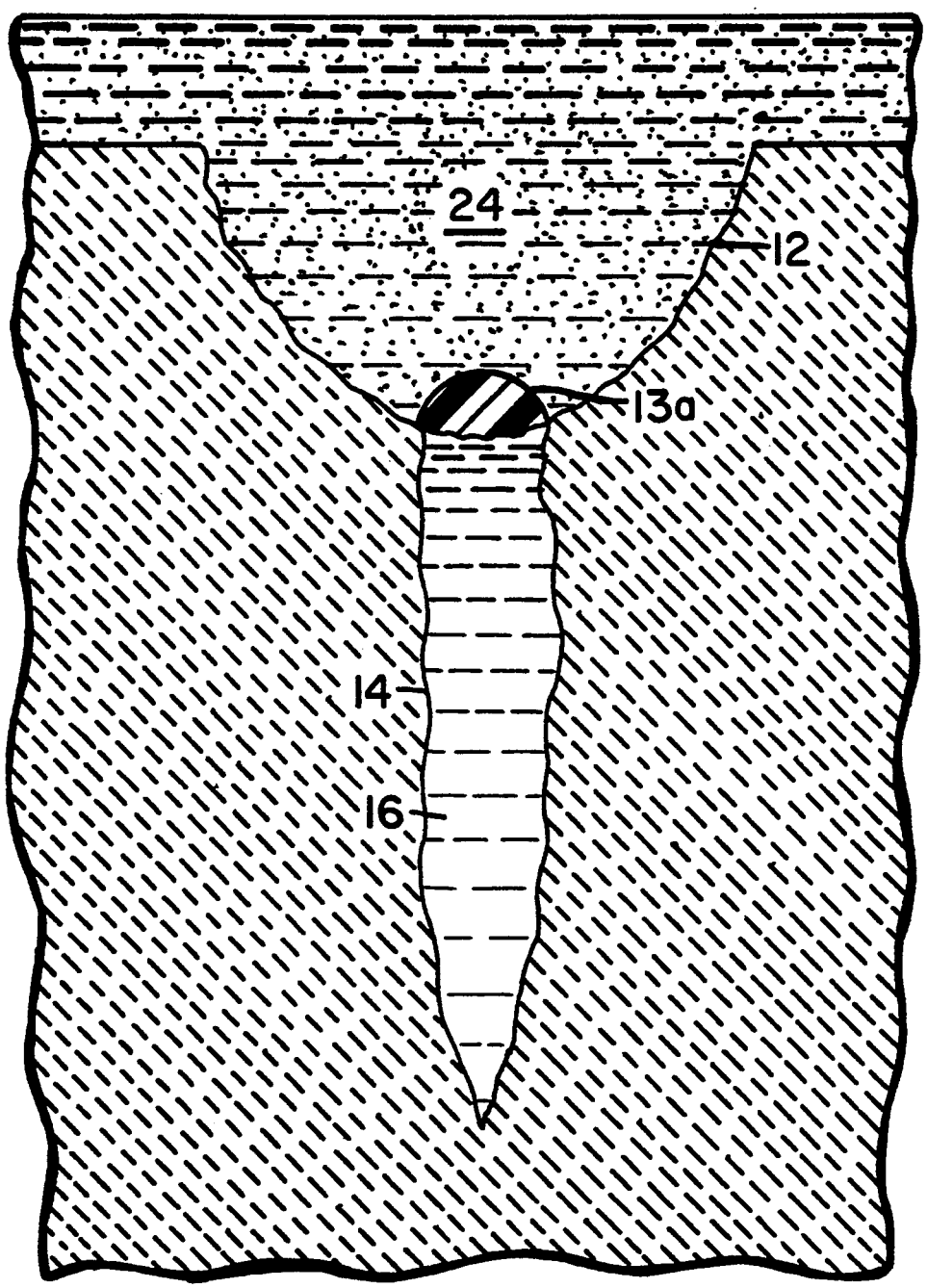
FIG. 3 is a schematic diagram showing a microcrack terminating in a micropore with part of the micropore filled with gel and the microcrack filled with buffer solution.

FIG. 3 is a schematic diagram showing a microcrack (14) terminating in a micropore (12) with part (13a) of the micropore filled with gel. The microcrack is filled with buffer solution (16). The slurry is shown as (24) deposited in the remainder of the micropore and on the outer surface of the body.

Catalyst metals, which can be in the form of oxides and precursor salt solutions can be included in the washcoat to form a catalyst on the substrate. The metals and compounds used as catalysts are known in the art and the invention is not limited to the type of metals and compounds that can be used. This depends on the particular application. Most typically the metals are transition metals such as base metals and noble metals, e.g., Pt, Pd, and Rh.

The resulting green coated substrate is then typically dried to remove the slurry medium and other liquid phases that can be present.

The green coated substrate is then heat-treated or calcined at a sufficient temperature for a sufficient time to remove a substantial portion of the buffer compounds from the microcracks and any other part of the substrate where there can be residual buffer solution, and to form the washcoat on the substrate, and to bond the particulates of the washcoat to the substrate and to each other. The heat-treating conditions vary with the specific slurry components, size and configuration of the substrate, and other processing conditions. However, in general the heat treating conditions are about 500° C. to about 800° C. for about 30 minutes to about 6 hours, particularly for an alumina washcoat.

The washcoat of the present invention affords the high surface area for catalyst support while the relatively low porosity of the body and its associated advantages are retained. In general, the average pore size of washcoats is about 2 to 70 micrometers in diameter, and preferably about 3 to 50 micrometers in diameter for most/applications.

The washcoated substrate made by the method of the present invention can be impregnated with at least one metal catalyst precursor (whether or not catalyst metals were included in the above described slurry) followed by firing the resulting impregnated washcoat to form a highly dispersed metal catalyst on the washcoat. This can be done similarly for an oxide catalyst. This is done typically by dipping, spraying, or washing the washcoated substrate with a solution of the metal salt such as solutions of chloroplatinic acid, palladium nitrate, rhodium nitrate, etc. This impregnation technique of applying metals to a substrate is known in the art. The catalyst metals are as described above.

One especially suited catalyst application is as a main catalyst for converting $NO_x$, CO, and hydrocarbons in automotive engine exhaust to innocuous products. By innocuous products is meant those that are generally considered to be harmless to health and the environment such as, $CO_2$, $N_2$, $H_2$, and water. There are numerous compositions of main body catalysts known in the art and the invention is not limited to any specific main body catalyst. However, some typical main body catalysts are for example, noble metal as e.g., Pt, Pd, Rh, or combinations thereof on a support (washcoat, e.g., of alumina) formed by the method of the present invention. Other constituents such as binders and promotors can be present, e.g., ceria, lanthana, zirconia, yttria, or combinations thereof and these can be applied with the previously described alumina washcoat slurry. It is especially preferred to use a three-way catalyst. Some typical three-way catalysts which are especially suited to the practice of the present invention for auto exhaust conversion are Pt on ceria-alumina combined with Rh on zirconia. The Pt-ceria-alumina and the Rh-zirconia can be combined and applied at once, as in a single coating or they can be applied in separate coatings. Another suitable catalyst is Pt/Pd/Rh on gamma alumina with a rare earth oxide such as ceria.

The advantages afforded by the present invention are shown when the thermal shock resistance of a washcoated substrate of the present invention is compared with that of a washcoated substrate produced without first blocking the microcracks by the buffer solution as is done in the practice of the present invention. The thermal shock resistance of the former is higher than that of the latter as will be seen in the examples now to be presented.

To more fully illustrate the invention, the following non-limiting examples are presented. All parts, portions, and percentages are on a weight basis unless otherwise stated.

EXAMPLE 1

Cordierite honeycomb substrates having 62 cells per $cm^2$ (400 cells/$in^2$) with 0.15 mm (6 mil) wall thickness were washcoated according to the following method.

A mixture of 50% pH 6.0 buffer (LABCRAFT, monobasic potassium phosphate and sodium hydroxide) and 50% deionized water was prepared. The resulting solution had a pH of about 5.3. Another buffer solution with pH 7 (LABCRAFT, monobasic potassium phosphate and sodium hydroxide was also used). Each substrate was immersed in one of the buffer solutions for one minute, removed, and excess solution was blown off with compressed air. The loading of the buffer solution is about 20%. These substrates were dried in a microwave oven on the high setting for four minutes. During drying, the samples were removed at one minute intervals. Steam build up was removed from the honeycomb channels by application of high pressure air, and the sample was rotated 90 degrees prior to the next one minute drying interval. At the completion of drying, the substrates contained about 9% loading of the pH buffer solution. Loading was calculated by the formula:

$$\frac{g \text{ of solution}}{g \text{ of substrate}} \times 100$$

Immediately following the pretreatment, a high surface area alumina coating was applied. The alumina slurry was prepared by mixing 2400 g gamma alumina (Versal GH, mean particle size of 3 micrometers in diameter), about 2600 g of deionized water, and about 15 g of Surfynol 465 surfactant. The pH of this slurry was adjusted to about 3.63 by adding about 60 ml of a 1:1 solution of nitric acid and deionized water. Application of this alumina coating was completed by the dip coating method, as is well known in the art. The samples were then dried in an oven at about 100° C. and next fired at about 550° C. for about 6 hours (C and D).

Figure 4:
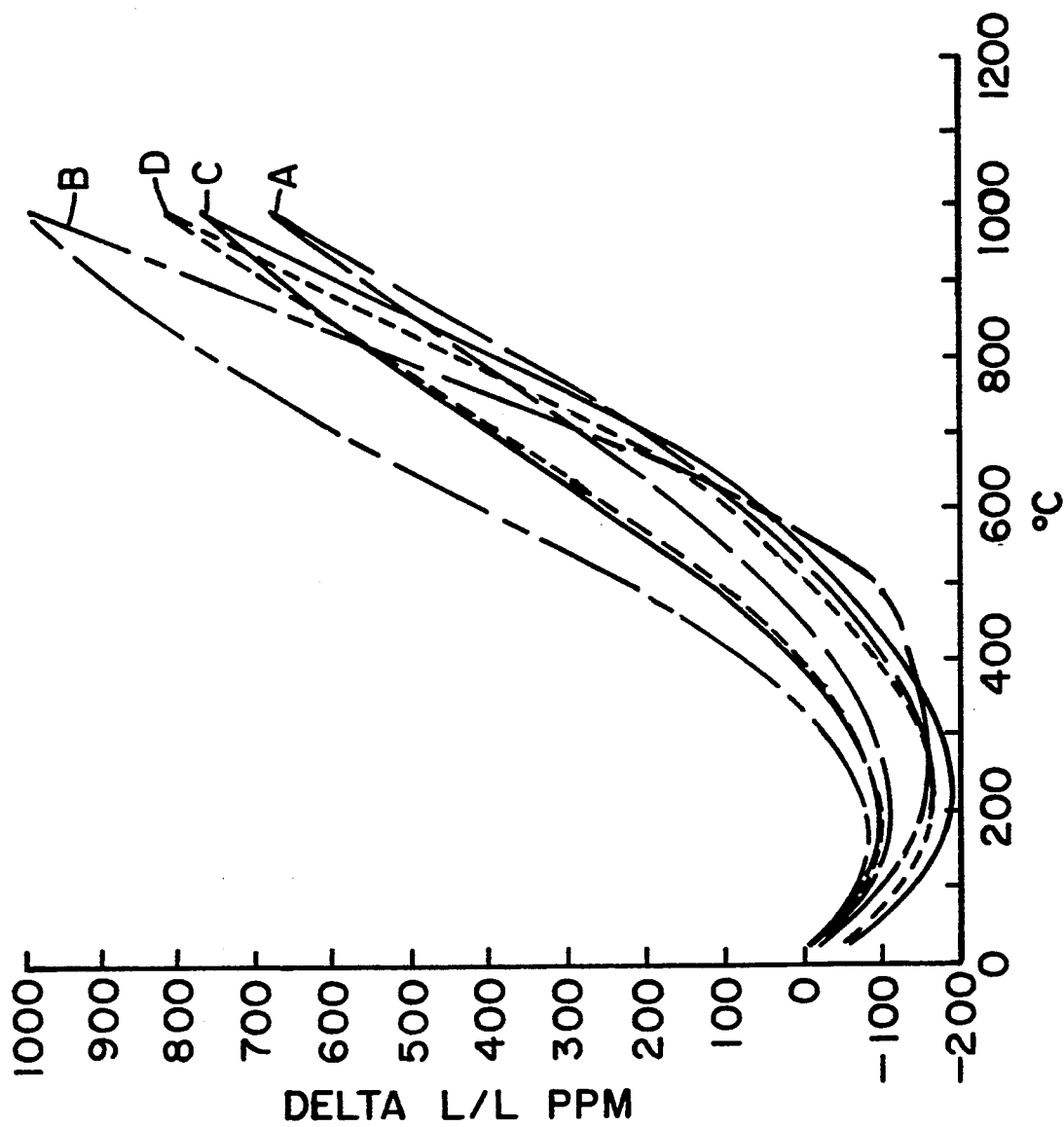
FIG. 4 is a plot of Delta L/L in ppm versus temperature for cordierite substrates. Delta L/L ppm is a measure of the change in length in ppm of which CTE is a function.

For comparison, an untreated substrate was also coated with the slurry in the same manner as above (B). Coefficients of thermal expansion (CTE) were measured on these samples. Table 1 shows the CTE during heating for these samples. FIG. 4 is a plot of Delta L/L in ppm versus temperature. Delta L/L ppm is a measure of the change in length in ppm of which CTE is a function. Sample A is a honeycomb without any coating.

TABLE 1

| Sample | Coating | Pre-treatment | Avg CTE (RT to 800° C.) cm/cm/°C. (heating) |
|---|---|---|---|
| A | Uncoated | — | $5.2 \times 10^{-7}$ |
| B | Coated | none | $9.4 \times 10^{-7}$ |
| C | Coated | 5.3 pH buffer | $6.8 \times 10^{-7}$ |
| D | Coated | 7.0 pH buffer | $6.8 \times 10^{-7}$ |

EXAMPLE 2

Cordierite honeycomb substrates having 62 cells/$cm^2$ (400 cells/$in^2$) with 0.2 mm (8 mil) wall thickness were coated with the following buffer solutions.

A mixture of 50% pH 6.0 buffer (LABCRAFT, monobasic potassium phosphate and sodium hydroxide) and 50% deionized water was prepared. The pH was about 5.3. A mixture of 50% pH 7 buffer (LABCRAFT, monobasic potassium phosphate and sodium hydroxide) and 50% deionized water was prepared. The pH was about 6.4. The procedure of Example 1 was followed. The results are given in Table 2. Samples G and H were microwave dried. Sample I was oven dried at about 100° C. for about 16 hr.

TABLE 2

| Sample | Coating | Pre-treatment | Avg CTE (RT to 800° C.) cm/cm/°C. (heating) |
|---|---|---|---|
| E | Uncoated | — | $6.5 \times 10^{-7}$ |
| F | Coated | none | $13.2 \times 10^{-7}$ |
| G | Coated | 5.3 pH buffer | $11.9 \times 10^{-7}$ |
| H | Coated | 6.4 pH buffer | $12.2 \times 10^{-7}$ |
| I | Coated | 6.4 pH buffer | $10.8 \times 10^{-7}$ |

EXAMPLE 3

Cordierite honeycomb substrates as in Example 2 were treated with buffer solutions as in Example 2. Immediately following the pretreatment, a high surface area alumina and ceria containing coating was applied. The slurry was prepared by mixing about 400 g of cerium acetate (Rhone Poluenc, 13.4 wt. % acetate, 7.25 wt. % $CeO_2$) and about 400 g of gamma alumina (Versal GH, mean particle size of about 3 micrometers in diameter). The pH of this slurry was adjusted to about 4.2 by adding about 30 ml of acetic acid. Application of this alumina coating was completed by the dip-coating method. The samples were then dried in an oven at about 100° C. and next fired at about 550° C. for about 6 hours.

For comparison, an untreated substrate was also coated in the same manner as in Examples 1 and 2. Coefficients of thermal expansion were measured on these samples. The results are given in Table 3.

TABLE 3

| Sample | Coating | Pre-treatment | Avg CTE (RT to 800° C.) cm/cm/°C. (heating) |
|---|---|---|---|
| E | Uncoated | — | $6.5 \times 10^{-7}$ |
| J | Coated | none | $12.7 \times 10^{-7}$ |
| K | Coated | 5.3 pH buffer | $11.7 \times 10^{-7}$ |
| L | Coated | 6.4 pH buffer | $12.1 \times 10^{-7}$ |

The tables and FIG. 4 show that the samples that had no buffer or slurry had the lowest CTE's as expected. The samples that were coated with the buffer solution according to the present invention had a lower CTE than the samples that were not coated prior to application of the alumina slurry.

It should be understood that while the present invention has been described in detail with respect to certain illustrative embodiments thereof, it should not be considered limited to such but may be used in other ways without departing from the spirit of the invention and the scope of the appended claims.

What is claimed is:

1. A method for producing a thermally shock resistant washcoated substrate, said method comprising:

a) providing a porous sintered body having microcracks and pores;
b) providing a washcoating slurry which comprises an oxide having a surface area of no less than about 50 m²/g or a precursor of said oxide and a gel-forming agent, and providing a buffer solution, wherein the washcoating slurry and the buffer solution are at pH's which result in formation of a gel on contact of the slurry with the buffer solution;
c) introducing the buffer solution into the microcracks, and optionally into the pores of the porous sintered body which have a size of less than about 5 micrometers in diameter,
d) contacting the porous sintered body having the introduced buffer solution with the washcoating slurry to form a gel at the interface of said buffer solution and said washcoating slurry, whereby the slurry is prevented from entering the microcracks; and
e) calcining the porous sintered body from step d at a temperature and for a time sufficient to form said washcoated substrate.

2. A method of claim 1 wherein said porous sintered body is made of material having predominant phases selected from the group consisting of ceramic, glass ceramic, glass, and combinations thereof.

3. A method of claim 2 wherein said predominant phases are ceramic.

4. A method of claim 3 wherein said ceramic is cordierite.

5. A method of claim 1 wherein said body is a honeycomb structure.

6. A method of claim 1 wherein the buffer solution is substantially volatilizable at temperatures of up to about 600° C.

7. A method of claim 1 wherein said buffer solution is a solution of compounds selected from the group consisting of ammonium chloride, ammonium acetate, ammonium nitrate, ammonium hydroxide, potassium phosphate, sodium hydroxide, boric acid, potassium chloride, sodium chloride, potassium carbonate, potassium borate, potassium hydroxide, and combinations thereof.

8. A method of claim 1 wherein the gel forming agent is selected from the group consisting of aluminum compounds, cerium compounds, barium compounds, lanthanum compounds, phosphates, silicon compounds, titanium compounds, zirconium compounds, and combinations thereof.

9. A method of claim 8 wherein the gel forming agent is selected from the group consisting of alumina, alumina precursors, ceria, baria, lanthana, lanthanates, silica, silicates, titania, titanates, zirconia, zirconates, and combinations thereof.

10. A method of claim 9 wherein the gel forming agent is selected from the group consisting alumina, alumina precursors, and combinations thereof.

11. A method of claim 10 wherein the gel forming agent is alumina.

12. A method of claim 11 wherein the pH of said buffer solution is at least about 5.

13. A method of claim 12 wherein the pH of said buffer solution is at least about 6.

14. A method of claim 13 wherein the pH of said buffer solution is about 6 to about 8.

15. A method of claim 14 wherein the slurry is at a pH of about 3 to about 4.

16. A method of claim 1 wherein the slurry contains one or more catalyst metals.

17. A method of claim 1 comprising the additional step of contacting said washcoated substrate with one or more catalyst metals to form a thermally shock resistant catalyst.

* * * * *